US008139457B2

(12) United States Patent
Cao et al.

(10) Patent No.: US 8,139,457 B2
(45) Date of Patent: Mar. 20, 2012

(54) SYSTEMS AND METHODS FOR LOW LATENCY MEDIA DEFECT DETECTION

(75) Inventors: Yang Cao, Longmont, CO (US); Scott M. Dziak, Fort Collins, CO (US); Nayak Ratnakar Aravind, Lancaster, PA (US); Richard Rauschmayer, Longmont, CO (US); Weijun Tan, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 615 days.

(21) Appl. No.: 12/236,148

(22) Filed: Sep. 23, 2008

(65) Prior Publication Data

US 2010/0074078 A1    Mar. 25, 2010

(51) Int. Cl.
G11B 20/18 (2006.01)
(52) U.S. Cl. ............................................... 369/53.16
(58) Field of Classification Search .................... None
See application file for complete search history.

(56) References Cited

U.S. PATENT DOCUMENTS

| | | | |
|---|---|---|---|
| 6,065,149 A | 5/2000 | Yamanaka | |
| 6,691,263 B2 | 2/2004 | Vasic et al. | |
| 6,738,948 B2 | 5/2004 | Dinc et al. | |
| 6,980,382 B2 | 12/2005 | Hirano et al. | |
| 7,099,241 B1 * | 8/2006 | Buchler et al. | 369/44.11 |
| 7,154,936 B2 | 12/2006 | Bjerke et al. | |
| 7,168,030 B2 | 1/2007 | Ariyoshi | |
| 7,203,015 B2 | 4/2007 | Sakai et al. | |
| 7,237,173 B2 | 6/2007 | Morita et al. | |
| 7,254,192 B2 | 8/2007 | Onggosanusi et al. | |
| 7,257,172 B2 | 8/2007 | Okamoto et al. | |
| 7,359,313 B2 | 4/2008 | Chan et al. | |
| 7,433,144 B2 * | 10/2008 | Singer | 360/69 |
| 7,441,174 B2 | 10/2008 | Li et al. | |
| 7,688,915 B2 | 3/2010 | Tanrikulu et al. | |
| 2002/0041459 A1 * | 4/2002 | Singer et al. | 360/69 |

(Continued)

FOREIGN PATENT DOCUMENTS

JP  10-145243  5/1998

(Continued)

OTHER PUBLICATIONS

Kavcic et al., "A Signal-Dependent Autoregressive Channel Model", IEEE Transactions on Magnetics, vol. 35, No. 5, Sep. 1999 pp. 2316-2318.

*Primary Examiner* — Thang Tran
*Assistant Examiner* — Huy D Nguyen
(74) *Attorney, Agent, or Firm* — Hamilton, DeSanctis & Cha

(57) ABSTRACT

Various embodiments of the present invention provide systems and methods for media defect detection. For example, a media defect detection systems is disclosed that includes a data input derived from a medium, a fast envelope calculation circuit that receives the data input and provides a fast decay envelope value based on the data input, a slow envelope calculation circuit that receives the data input and provides a slow decay envelope value based on the data input, and a media defect detection circuit. The media defect detection circuit receives the slow decay envelope value and the fast decay envelope value, calculates a ratio value of the fast decay envelope value to the slow decay envelope value, and asserts a defect output based at least in part on the comparison of the ratio value to a defect threshold value.

20 Claims, 8 Drawing Sheets

U.S. PATENT DOCUMENTS

| | | |
|---|---|---|
| 2003/0063405 A1 | 4/2003 | Jin et al. |
| 2003/0147172 A1* | 8/2003 | Singer et al. ............... 360/78.04 |
| 2007/0061687 A1 | 3/2007 | Hwang |
| 2007/0223755 A1* | 9/2007 | Salvetti et al. ................ 381/318 |
| 2009/0235116 A1 | 9/2009 | Tan et al. |
| 2009/0235146 A1 | 9/2009 | Tan et al. |
| 2009/0268575 A1 | 10/2009 | Tan et al. |
| 2009/0268848 A1 | 10/2009 | Tan et al. |
| 2009/0271670 A1 | 10/2009 | Tan et al. |
| 2010/0042877 A1 | 2/2010 | Tan |

FOREIGN PATENT DOCUMENTS

| | | |
|---|---|---|
| JP | 2007-087529 | 4/2007 |

* cited by examiner

SYSTEMS AND METHODS FOR LOW LATENCY MEDIA DEFECT DETECTION

BACKGROUND OF THE INVENTION

The present inventions are related to systems and methods for transferring information, and more particularly to systems and methods for determining problems related to a medium associated with a data transfer.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by any defects associated with the transfer medium. As an example, where the media is a storage medium, defects may be caused by a thinning of the medium or where an undesired particle is grown or embedded in the medium. In some cases, data loss caused by defects in the transfer medium can make recovery of data from the transfer medium difficult even for data received from non-defective areas or times.

Various approaches have been developed for identifying defects in the transfer medium. Such approaches provide a general ability to identify defects, but in many cases are inaccurate. In the best case, this inaccuracy limits the effectiveness of any defect identification. In the worst case, inaccurate defect detection may actually hamper the data recovery process. In other cases, information from a downstream process is used to perform the detection process. In such cases, there may be a substantial latency from the onset of a media defect until the media defect is flagged. This latency, if not properly considered, can result in improper attempts at circuit adaptation due to feedback used in existing data detection systems.

Hence, for at least the aforementioned reasons, there exists a need in the art for advanced systems and methods for defect detection.

BRIEF SUMMARY OF THE INVENTION

The present inventions are related to systems and methods for transferring information, and more particularly to systems and methods for determining problems related to a medium associated with a data transfer.

Various embodiments of the present invention provide data detection systems that include an analog input signal derived from a medium, an analog to digital converter, a data detector circuit, and a media defect detector circuit. The analog to digital converter receives the analog input signal and provides a digital sample corresponding to the analog input signal. The data detector circuit is operable to perform a data detection algorithm on the digital sample to provide a detected output, and to provide an adaptive feedback signal that indicates a difference between the digital sample and the detected output and is used to drive an adaptive feedback loop. The media defect detector circuit receives the digital sample, and is operable to determine whether the analog input signal is derived from a defective portion of the medium based in part on the digital sample and to assert a defect output. When the defect output is asserted, the adaptive feedback loop is disabled. In some instances of the aforementioned embodiments, the media defect detector circuit includes a fast envelope calculation circuit that receives the digital sample and provides a fast decay envelope value based on the digital sample, a slow envelope calculation circuit that receives the digital sample and provides a slow decay envelope value based on the digital sample, and a media defect determination circuit. The media defect determination circuit receives the slow decay envelope value and the fast decay envelope value, and calculates a ratio value of the fast decay envelope value to the slow decay envelope value. The defect output is asserted upon determining that the ratio value is greater than a defect threshold value. In some instances of the aforementioned embodiments, the medium is a magnetic storage medium and in other instances of the aforementioned embodiments, the medium is a wireless communication medium.

As used herein, the phrases "fast decay envelope value" and "slow decay envelope value" refer to values that decay from at or about a maximum of an input signal at a defined rate with the slow decay decaying at a rate less than the fast decay rate. As such, the respective decay envelope values represent an envelope around an input signal with different decay rates resulting in different envelopes. In one case, when the decaying value is less than the value of the input signal, the respective decay envelope value is set at or about the value of the input signal.

Other embodiments of the present invention provide media defect detection systems that include a data input derived from a medium, a fast envelope calculation circuit that receives the data input and provides a fast decay envelope value based on the data input, a slow envelope calculation circuit that receives the data input and provides a slow decay envelope value based on the data input, and a media defect detection circuit. The media defect detection circuit receives the slow decay envelope value and the fast decay envelope value, calculates a ratio value of the fast decay envelope value to the slow decay envelope value, and asserts a defect output based at least in part on the comparison of the ratio value to a defect threshold value.

In some instances of the aforementioned embodiments, the defect detection system is part of a data detection system including at least one adaptive feedback loop, and wherein the media defect detection circuit is operable to disable the adaptive operation of the adaptive feedback loop upon assertion of the defect output. In some instances of the aforementioned embodiments, the systems further include a moving average filter that is operable to receive a current data sample and to calculate a moving average value based on the current data sample and one or more preceding data samples, and to subtract the moving average value from the current data sample to yield the data input. In some such instances, the systems further include an analog to digital converter producing the current data sample and the one or more preceding data samples correspond to an analog input received by the analog to digital converter.

Yet other embodiments of the present invention provide methods for detecting a media defect. Such methods include deriving a data input from a medium, calculating a fast decay envelope value using the data input, calculating a slow decay envelope value using the data input, calculating a ratio of the fast decay envelope value to the slow decay envelope value to generate a ratio value, and asserting a defect output based at least in part on a comparison of the ratio value with a defect threshold value. In some instances of the aforementioned embodiments, the methods further include providing a data detection circuit including at least one feedback loop that is disabled when the defect output is asserted. Such disabling may be accomplished by, for example, forcing an error indicator associated with the feedback loop to a value indicating the lack of an error.

In some instances of the aforementioned embodiments, the methods further include deriving another data input from the medium, and calculating another fast decay envelope value and slow decay envelope value using the new data input. A ratio value corresponding to the new fast decay envelope value and slow decay envelope value is calculated, and the defect output is deasserted based at least in part on a comparison of the second ratio value with the defect threshold value. In some such cases, a defined period is awaited after comparison of the new ratio value with the defect threshold value.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for transferring information, and more particularly to systems and methods for determining problems related to a medium associated with a data transfer.

Figure 1:
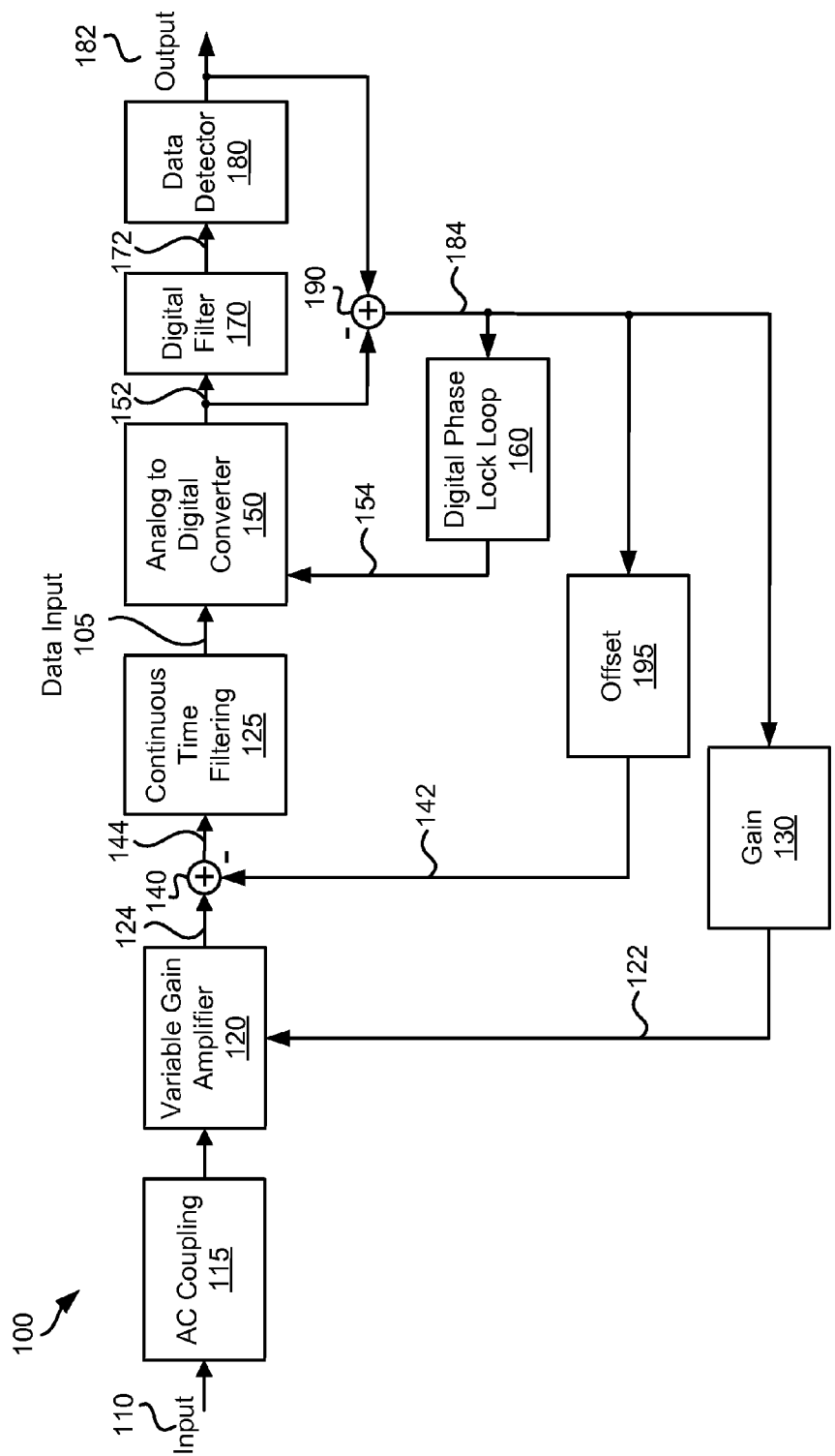
FIG. 1 depicts an exemplary, existing data detection system including various feedback loops.

Turning to FIG. 1, an exemplary, existing data detection system 100 including various feedback loops is depicted. Data detection system 100 includes an analog front end that receives an analog input signal 110 via some form of AC coupling 115. The output of AC coupling 115 is amplified using a variable gain amplifier 120. The gain applied by variable gain amplifier 120 is governed by a gain feedback 122 that is provided by a gain calculation circuit 130. The amplified input 124 is summed with an offset value 142 using a summation element 140. Offset value 142 is provided by an offset circuit 195. The sum 144 is provided to a continuous time filter 125 that operates to filter undesirable noise from the received analog signal. Continuous time filter 125 provides a data input 105 that is representative of analog input signal 110.

Data input 105 is provided to an analog to digital converter 150 that converts the continuous analog signal into a series of corresponding digital samples 152. Digital samples 152 are sampled in accordance with a clock signal 154 generated based on the received data by a digital phase lock loop circuit 160. Digital samples 152 are provided to a digital filter 170 that provides a filtered output 172 to a data detector 180. Data detector 180 provides an ideal output 182 that is subtracted from the corresponding digital samples 152 using a summation element 190. The resulting output of summation element 190 is an error signal 184 that is used to drive digital phase lock loop circuit 160, offset circuit 195 and gain calculation circuit 130.

Figure 2:
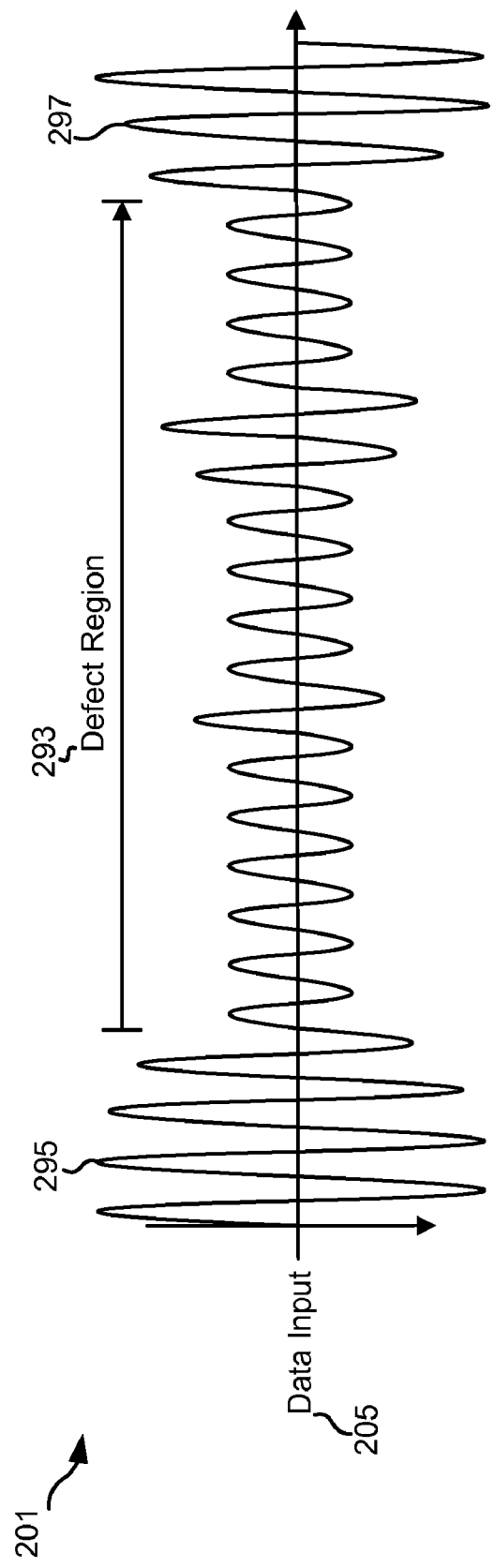
FIG. 2 depicts an exemplary data input signal derived from both defective media regions and non-defective media regions.

Turning to FIG. 2, a timing diagram 201 depicts an exemplary data input signal 205 derived from both defective media regions 293 and non-defective media regions 295, 297. It should be noted that the various data inputs and outputs are merely exemplary and that circuit operation will vary depending upon the particular data inputs and system implementation. Of note, data from the defective portion may include a DC offset that may be eliminated through use of a filter (not shown) as will be appreciated by one of ordinary skill in the art based on the disclosure provided herein. Data from the non-defective medium (portions 295, 297) exhibits a relatively high amplitude when compared with that from the defective medium (portion 293).

Of note, data detection system 100 utilizes three adaptive feedback loops. The first loop includes digital phase lock loop circuit 160 and is operable to adaptively adjust the sampling period used by analog to digital converter 150 to sample data input 105 (i.e., adjusting the phase and/or frequency of clock signal 154). The second loop includes offset circuit 195 that is used to adaptively adjust any DC offset from the received analog input. The third loop includes gain calculation circuit 195 that is used to adaptively adjust the gain used in pre-processing the received analog input signal. When data input 105 includes a media defect region such as that depicted in FIG. 2, the operation of the feedback loops is harmful to the system operation. In particular, when data input 105 is derived from the defect region, a large number of errors in ideal output 182 compared to digital samples 152 will be expected resulting in a dramatic increase in the magnitude of error signal 184. While this error result is not adaptively correctable due to the defective media, each of the three feedback loops will generate an output seeking to adaptively correct the error. This potentially results in an unnecessary circuit oscillation. Once data input 105 transitions back into a non-defective region, error signal 184 will again be relatively large and it will take some time for the three feedback loops to re-adapt to data received from a non-defective region. Thus, in some cases, there may be a loss of data not only due to the defective media, but also to the delay in re-adapting data detection system 100 to non-defective data regions.

Figure 3:
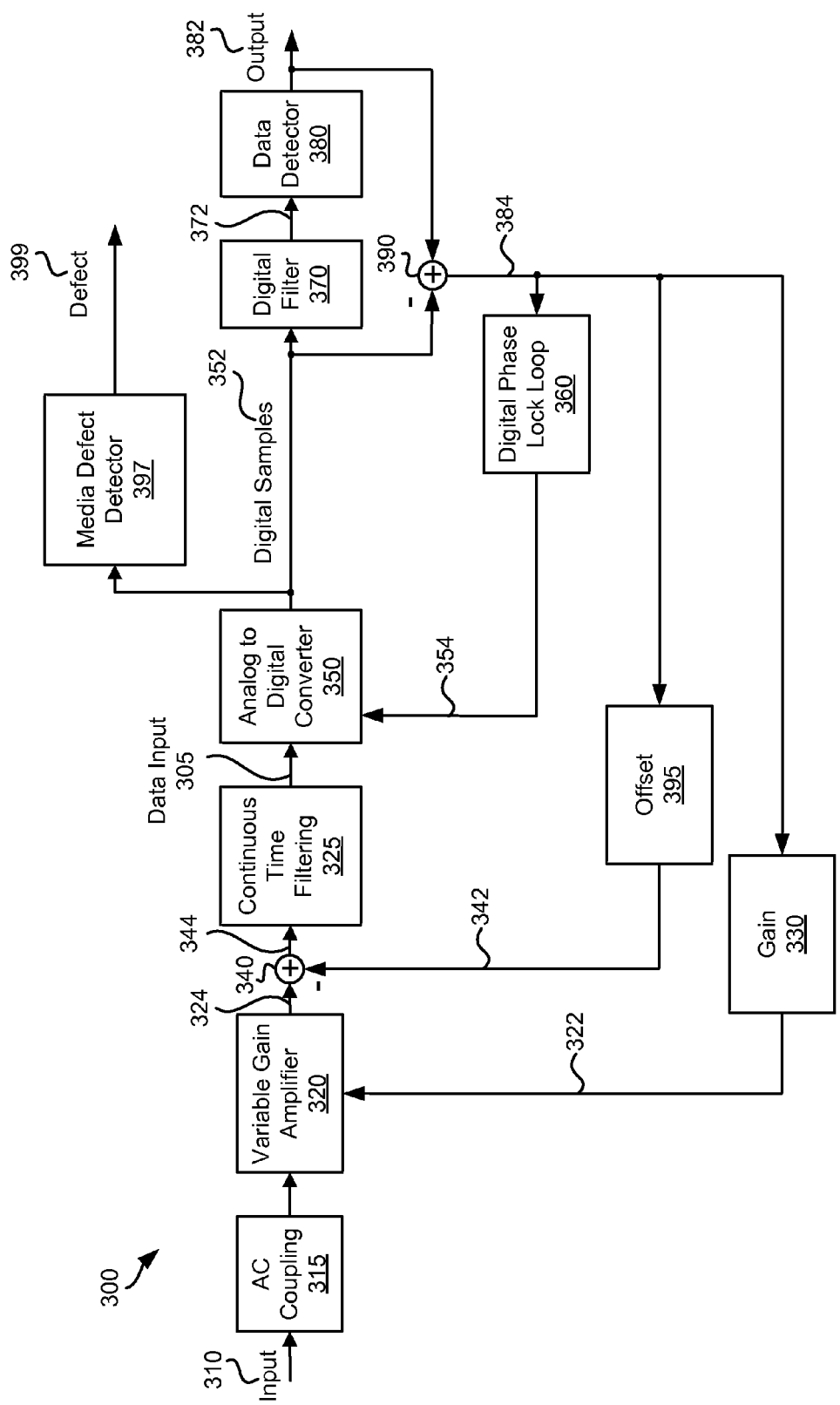
FIG. 3 shows a data detection system including a media defect detector in accordance with various embodiments of the present invention.

Turning to FIG. 3, a data detection system 300 is depicted in accordance with some embodiments of the present invention. Data detection system 300 is capable of reducing or eliminating the effect on the feedback loops of spurious data received from a region where the media is defective. Data detection system 300 includes an analog front end that receives an analog input signal 310 via some form of AC coupling 315. Based on the disclosure provided herein, one of ordinary skill in the art will recognize a variety of circuitry that may be used to couple an input signal to an analog front end. As an example, where input signal 310 is a magnetic signal sensed from a magnetic storage medium, AC coupling 315 may include circuitry capable of converting a sensed magnetic field to a corresponding analog electrical signal. The output of AC coupling 315 is amplified using a variable gain amplifier 320. Variable gain amplifier 320 may be any amplifier known in the art that is capable of receiving an analog input signal and providing an amplified analog signal. The gain applied by variable gain amplifier 320 is governed by a gain feedback 322 that is provided by a gain calculation circuit 330. Gain calculation circuit 330 may be any circuit known in the art that is capable of providing a variable gain output based on an input error signal. The amplified input 324 is summed with an offset value 342 using a summation element 140. Offset value 342 is provided by an offset circuit 395 that is designed to adjust any DC offset included in the received analog input signal. The sum 344 is provided to a continuous time filter 325 that operates to filter undesirable noise from the received analog signal. Continuous time filter 325 may be any filter known in the art that is capable of reducing or eliminating noise from a received analog signal. As some examples, continuous time filter 325 may be a low pass filter capable of reducing or eliminating high frequency noise from a signal, a high pass filter capable of reducing or eliminating low frequency noise from a signal, or a band pass filter capable of reducing or eliminating both high frequency noise and low frequency noise from a signal. Based on the disclosure provided herein, one of ordinary skill in the art will recognize a variety of filters and filter architectures that may be used in accordance with different embodiments of the present invention. Continuous time filter 325 provides a data input 305 that is representative of analog input signal 310.

Data input 305 is provided to an analog to digital converter 350 that converts the continuous analog signal into a series of corresponding digital samples 352. Digital samples 352 are sampled in accordance with a clock signal 354 generated based on the received data by a digital phase lock loop circuit 360. Digital samples 352 are provided to a digital filter 370 that provides a filtered output 372 to a data detector 380. Digital filter 370 may be, for example, a digital finite impulse response filter as are known in the art. Data detector 380 provides an ideal output 382 that is subtracted from the corresponding digital samples 352 using a summation element 390. The resulting output of summation element 390 is an error signal 384 that is used to drive digital phase lock loop circuit 360, offset circuit 395 and gain calculation circuit 330. Data detector 380 may be any data detector circuit known in the art. Thus, as an example, data detector 380 may be a Viterbi algorithm data detector. Based upon the disclosure provided herein one of ordinary skill in the art will appreciate a variety of data detectors that may be utilized in relation to different embodiments of the present invention.

As shown, data detection system 300 utilizes three adaptive feedback loops. The first loop includes digital phase lock loop circuit 360 and is operable to adaptively adjust the sampling period used by analog to digital converter 350 to sample data input 305 (i.e., adjusting the phase and/or frequency of clock signal 354). The second loop includes offset circuit 395 that is used to adaptively adjust any DC offset from the received analog input. The third loop includes gain calculation circuit 395 that is used to adaptively adjust the gain used in pre-processing the received analog input signal.

Digital samples 352 are additionally provided to a media defect detector circuit 397. Media defect detector circuit 352 is operable to detect a potential media defect such as that depicted in FIG. 2. When a potential media defect is detected, media defect detector circuit 397 asserts a defect flag 399. When defect flag 399 is asserted, error signal 384 is forced to zero (i.e., forced to a condition indicating the lack of any feedback error). This condition is maintained until defect flag 399 is de-asserted. Defect flag 399 may be de-asserted immediately upon discerning that digital samples 352 correspond to a non-defective region of the media from which input signal 310 is derived. At this point, error signal 384 again indicates a difference between ideal output 382 and digital samples 352 and the feedback loops again begin adaptively compensating for error signal 384. Alternatively, in some embodiments of the present invention, defect flag 399 may be de-asserted at some delayed time after discerning that digital samples 352 correspond to a non-defective region of the media from which input signal 310 is derived. This raises the assurance that the defective region has indeed been cleared and protects the operation of the feedback loops from spurious input received from defective regions. As described above, defect signal 399 forces error signal to a zero value. This may be achieved through a variety of circuit mechanisms including, but not limited to, the use of a multiplexer to drive error signal 384 either to zero or to the output of summation element 390. Based on the disclosure provided herein, one of ordinary skill in the art will recognize a variety of approaches that may be used in accordance with different embodiments of the present invention to effectively eliminate the effect of error signal 384 on the three feedback loops.

It should be noted that data detection system 300 is provided as an example where media defect detector circuit 397 is used to effectively disable adaptive feedback loops during periods where data is being derived from a defective medium. Thus, it should be noted that media defect detector circuit 397 may be used in relation to other data detection systems having more or fewer adaptive feedback loops and/or different components.

Figure 4:
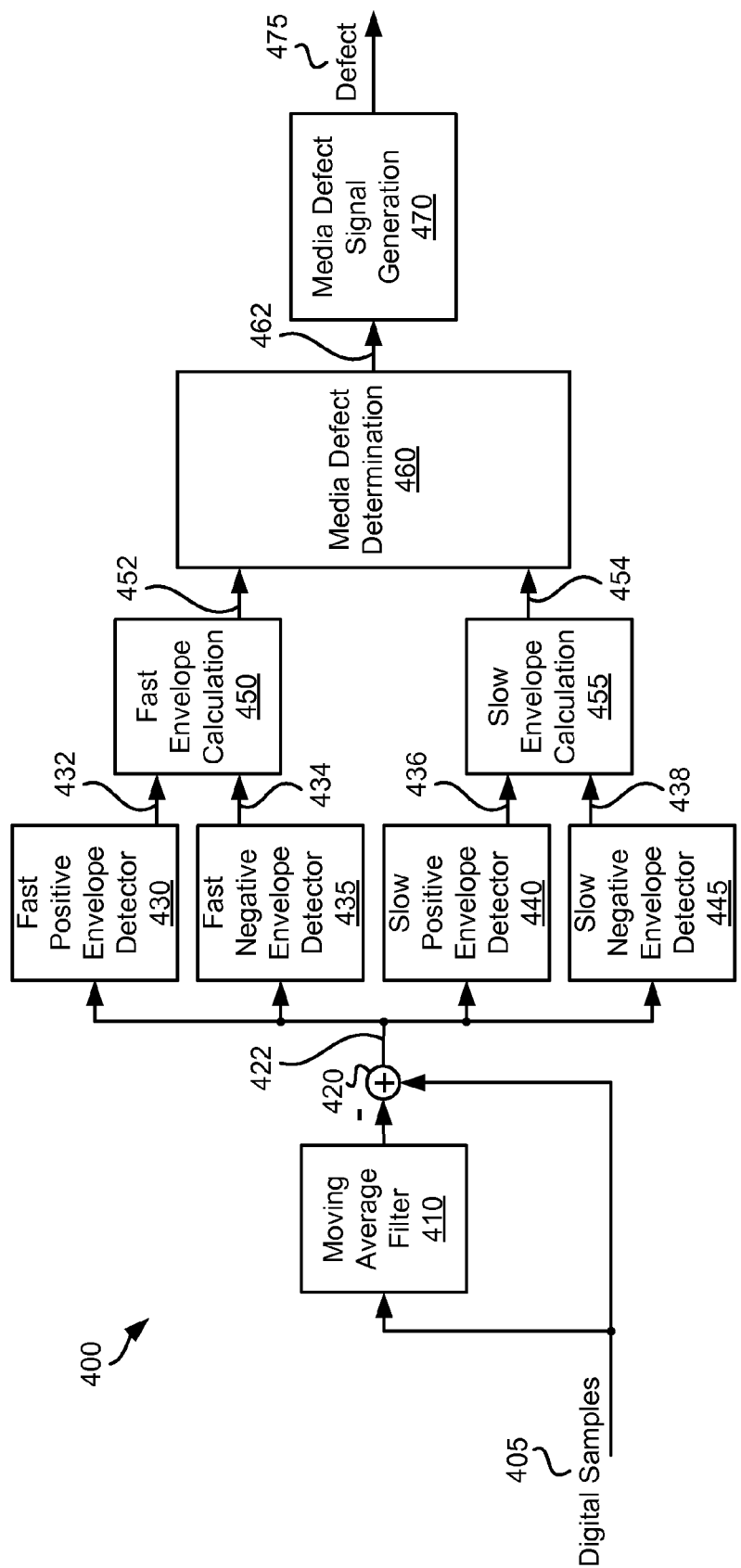
FIG. 4 depicts a media defect detector circuit in accordance with one or more embodiments of the present invention.

Turning to FIG. 4, a media defect detector circuit 400 is shown in accordance with one or more embodiments of the present invention. Media defect detector circuit 400 includes a moving average filter circuit 410. A signal received from a defective region of a medium often exhibits a significant DC shift. Maintaining a moving average of the received digital samples 405, and subtracting the resulting average from the current digital samples operates to combat any DC shift occurring in relation to a defective medium region. Moving average filter circuit 410 includes the ability to average digital samples 405 across a large enough period to assure that the output of moving average filter circuit 410 adequately represents any DC offset in the received signal. In some embodiments of the present invention, samples for five or more bit periods are averaged at a time, with the oldest value of digital samples 405 being replaced by the most recent value of digital samples 405.

The resulting moving average from moving average filter circuit 410 is subtracted from the current value of digital samples 405 using a summation element. This subtraction yields a substantially DC free sample value at the output of summation element 420. An output 422 from summation element 420 is provided in parallel to four separate envelope detector circuits: a fast positive envelope detector circuit 430, a fast negative envelope detector circuit 435, a slow positive envelope detector circuit 440, and a slow negative envelope detector circuit 445. Fast positive envelope detector circuit 430 applies the following algorithm to output 422:

$$e^+_{fast}(k+1) = \max\{x_k, e^+_{fast}(k) - \Delta^+_{fast}\},$$

where $x_k$ indicates a prior value of output 422, $e^+_{fast}(k)$ indicates a prior value of an output 432 of fast positive envelope detector 430, $e^+_{fast}(k+1)$ indicates the next value of output 432, and $\Delta^+_{fast}$ indicates a fast decay rate. Fast negative envelope detector circuit 435 applies the following algorithm to output 422:

$$e^-_{fast}(k+1)=\min\{x_k, e^-_{fast}(k)+\Delta^-_{fast}\},$$

where $e^-_{fast}(k)$ indicates a prior value of an output 434 of fast negative envelope detector 435, $e^-_{fast}(k+1)$ indicates the next value of output 434, and $\Delta^-_{fast}$ indicates the same fast decay rate of $\Delta^+_{fast}$. Slow positive envelope detector circuit 440 applies the following algorithm to output 422:

$$e^+_{slow}(k+1)=\max\{x_k, e^+_{slow}(k)-\Delta^+_{slow}\},$$

where $e^+_{slow}(k)$ indicates a prior value of an output 436 of slow positive envelope detector 440, $e^+_{slow}(k+1)$ indicates the next value of output 436, and $\Delta^+_{slow}$ indicates a slow decay rate that is less than fast decay rate, $\Delta^+_{fast}$. Slow negative envelope detector circuit 445 applies the following algorithm to output 422:

$$e^-_{slow}(k+1)=\min\{x_k, e^-_{slow}(k)+\Delta^-_{slow}\},$$

where $e^-_{slow}(k)$ indicates a prior value of an output 438 of slow negative envelope detector 445, $e^-_{slow}(k+1)$ indicates the next value of output 438, and $\Delta^-_{slow}$ indicates the same slow decay rate $\Delta^+_{slow}$. It should be noted, however, that the decay rates for the slow and positive envelope calculations do not need to be the same.

Outputs 432, 434 are each provided to a fast envelope calculation circuit 450, and outputs 436, 438 are each provided to a slow envelope calculation circuit 455. Fast envelope calculation circuit 450 provides an output 452 described by the following equation:

$$e_{fast}(k+1)=e^+_{fast}(k+1)-e^-_{fast}(k+1).$$

Similarly, slow envelope calculation circuit 455 provides an output 454 described by the following equation:

$$e_{slow}(k+1)=e^+_{slow}(k+1)-e^-_{slow}(k+1).$$

Outputs 452, 454 are each provided to a media defect determination circuit 460 that combines the values of the outputs for comparison against a threshold to determine whether a media defect is detected. Media defect determination circuit 460 provides an output 462 defined by the following equation:

$$\text{Defect Ratio}=e_{fast}/e_{slow}.$$

Where the defect ratio is greater than a defined threshold, output 462 is asserted. Output 462 is provided to a media defect signal generation circuit 470 that is operable to control the immediacy of an assertion of a defect output 475 and the duration of the assertion. In some embodiments of the present invention, media defect signal generation circuit 470 includes a re-settable/re-loadable counter that counts the number of periods after the media defect region is cleared. In such cases, defect output 475 may remain asserted until the counter reaches a defined count value.

Figure 5A:
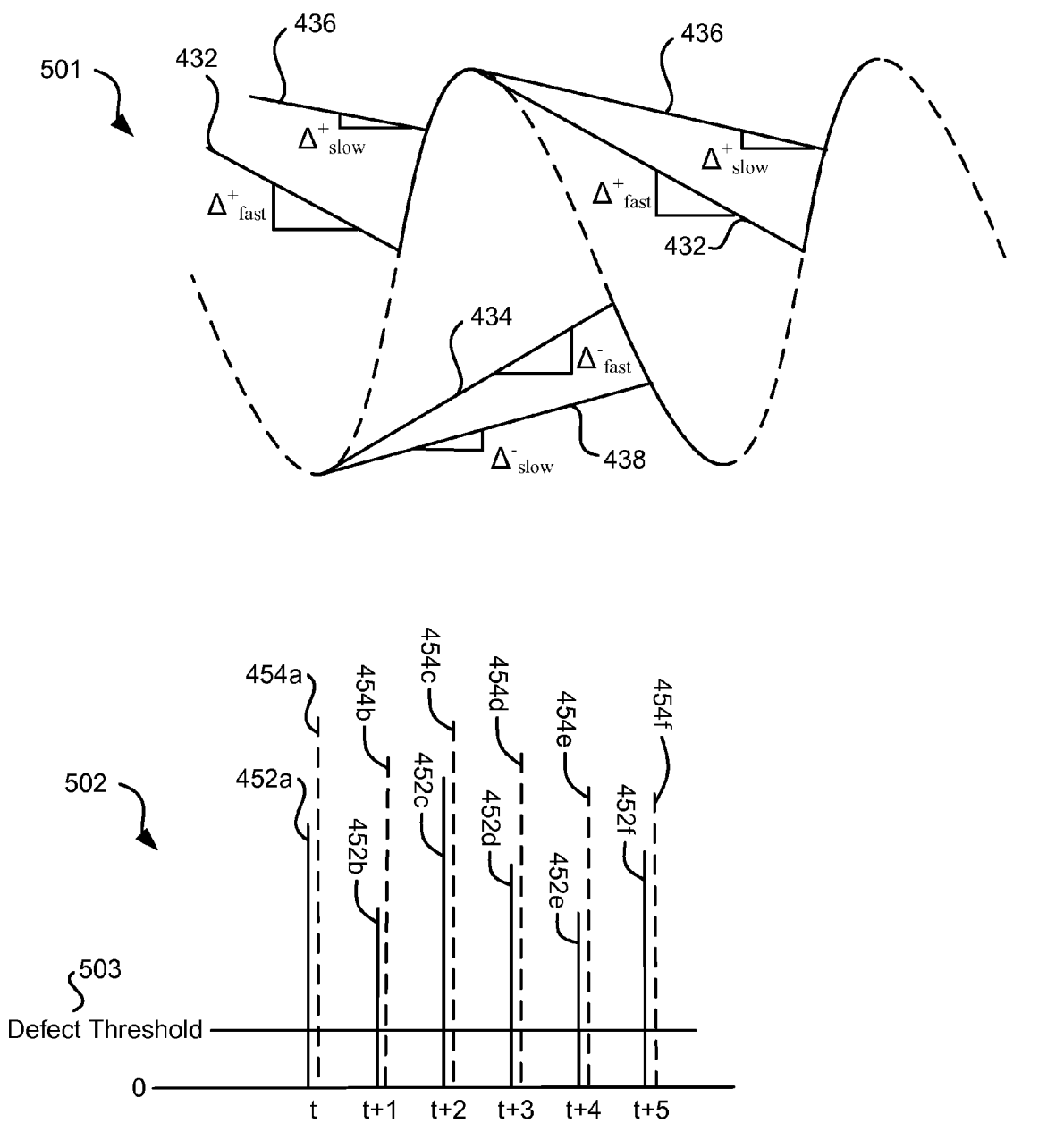
FIGS. 5a-5b graphically depict an exemplary operation of the media defect detector of FIG. 4 during data retrieval from both non-defective media regions and defective media regions.

FIG. 5a graphically depicts an exemplary operation of media defect detector 400 during data retrieval from a non-defective media region. A timing diagram 501 shows output 422 as a cyclical signal with a reasonably consistent amplitude as would be expected when data is being retrieved from a non-defective region of a medium. As shown, the value of $e^+_{fast}$ (output 432) changes by an amount ($\Delta^+_{fast}$) that is slower than the rate at which output 422 decreases. Output 432 assumes the value of output 422 or of the value degraded by $\Delta^+_{fast}$ depending upon whichever is greater in accordance with the following equation:

$$e^+_{fast}(k+1)=\max\{x_k, e^+_{fast}(k)-\Delta^+_{fast}\}.$$

The value of $e^-_{fast}$ (output 434) changes by an amount ($\Delta^-_{fast}$) that is slower than the rate at which output 422 increases. Output 434 assumes the value of output 422 or of the value degraded by $\Delta^-_{fast}$ depending upon whichever is less in accordance with the following equation:

$$e^-_{fast}(k+1)=\min\{x_k, e^-_{fast}(k)+\Delta^-_{fast}\}.$$

The value of $e^+_{slow}$ (output 436) changes by an amount ($\Delta^+_{slow}$) that is slower than the rate at which output 422 decreases. Output 436 assumes the value of output 422 or of the value degraded by $\Delta^+_{slow}$ depending upon whichever is greater in accordance with the following equation:

$$e^+_{slow}(k+1)=\max\{x_k, e^+_{slow}(k)-\Delta^+_{slow}\}.$$

The value of $e^-_{slow}$ (output 438) changes by an amount ($\Delta^-_{slow}$) that is slower than the rate at which output 422 increases. Output 438 assumes the value of output 422 or of the value degraded by $\Delta^-_{slow}$ depending upon whichever is less in accordance with the following equation:

$$e^-_{slow}(k+1)=\min\{x_k, e^-_{slow}(k)+\Delta^-_{slow}\}.$$

A timing diagram 502 depicts the values of $e_{fast}$ (output 452 shown as solid lines) and $e_{slow}$ (output 454 shown as dashed lines) at different calculation periods (t, t+1, t+2, . . . ). As discussed above, outputs 452, 454 respectively correspond to the following equations:

$$e_{fast}(k+1)=e^+_{fast}(k+1)-e^-_{fast}(k+1), \text{ and}$$

$$e_{slow}(k+1)=e^+_{slow}(k+1)-e^-_{slow}(k+1).$$

Of note, the values of outputs 452, 454 are reasonably constant over the calculation periods, and at all times exceed a defect threshold value 503. Further, the ratio of output 452 to output 454 remains reasonably constant over the depicted period. As the ratio at all times exceeds a defect threshold value 503, a defect is not indicated, and thus defect output 475 remains deasserted. This situation is expected where the received data is not derived from a defective region of the media.

Figure 5B:
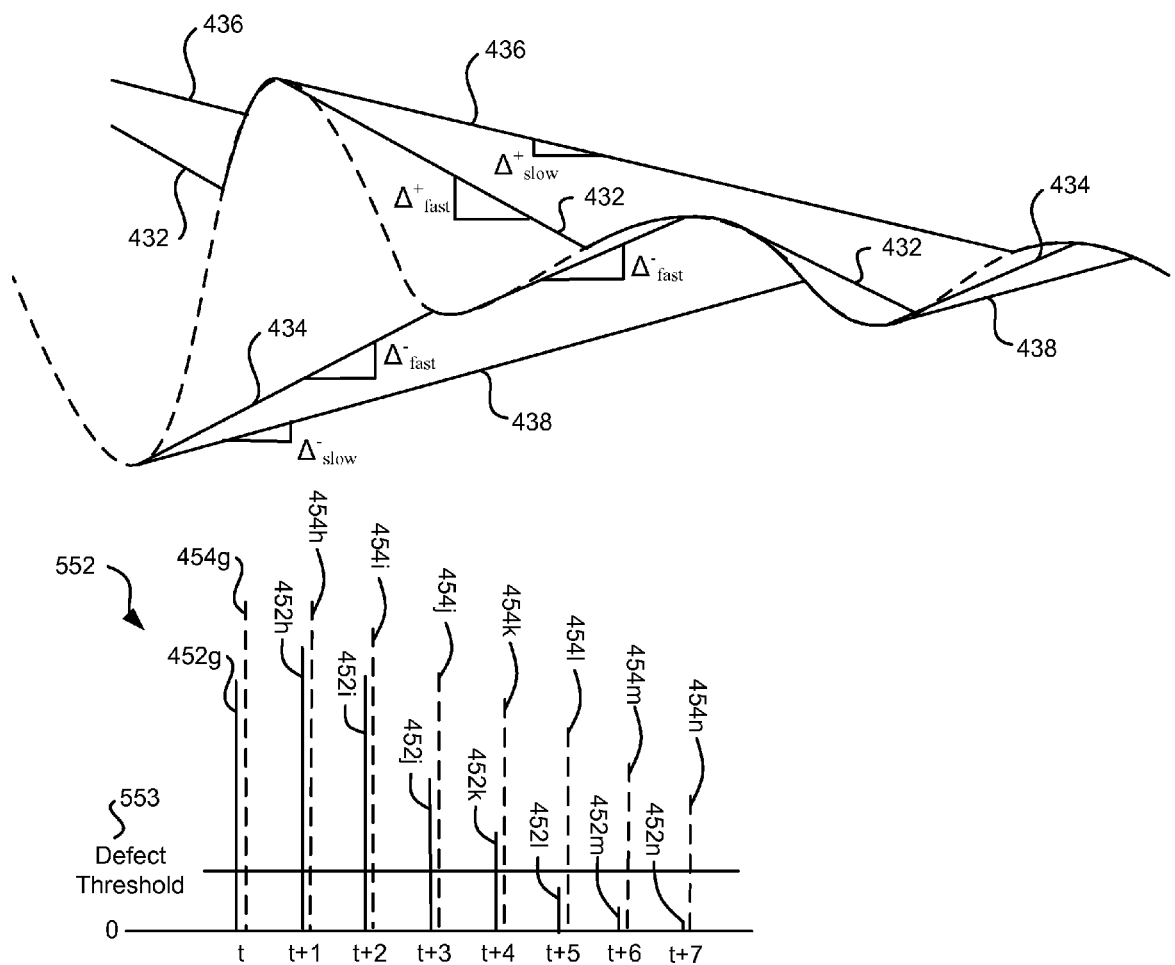

FIG. 5b graphically depicts an exemplary operation of media defect detector 400 during data retrieval during a transition from a non-defective media region to a defective media region. A timing diagram 551 shows output 422 as a cyclical signal with a degrading amplitude representing the transition to a defective region of the media from which the data is derived. As shown, the value of $e^+_{fast}$ (output 432) changes by an amount ($\Delta^+_{fast}$) that is slower than the rate at which output 422 decreases. Output 432 assumes the value of output 422 or of the value degraded by $\Delta^+_{fast}$ depending upon whichever is greater. The value of $e^-_{fast}$ (output 434) changes by an amount ($\Delta^-_{fast}$) that is slower than the rate at which output 422 increases. Output 434 assumes the value of output 422 or of the value degraded by $\Delta^-_{fast}$ depending upon whichever is greater. The value of $e^+_{slow}$ (output 436) changes by an amount ($\Delta^+_{slow}$) that is slower than the rate at which output 422 decreases. Output 436 assumes the value of output 422 or of the value degraded by $\Delta^+_{slow}$ depending upon whichever is greater. The value of $e^-_{slow}$ (output 438) changes by an amount ($\Delta^-_{slow}$) that is slower than the rate at which output 422 increases. Output 438 assumes the value of output 422 or of the value degraded by $\Delta^-_{slow}$ depending upon whichever is greater.

A timing diagram 552 depicts the values of $e_{fast}$ (output 452 shown as solid lines) and $e_{slow}$ (output 454 shown as dashed lines) at different calculation periods (t, t+1, t+2, . . . ). Of note, the values of outputs 452, 454 continue to decrease as the transition from the non-defective media region to the defective media region occurs. Further, the ratio of output 452 to output 454 declines dramatically between calculation period t+2 and calculation period t+3. Once this ratio falls below a defect threshold value 553, a defect is indicated. At this point, defect output 475 is asserted. It should be noted that in some embodiments of the present invention the threshold must be exceeded for a certain number of consecutive calculation periods before defect output 475 is asserted. Such an approach operates to filter out any spurious noise that is not necessarily indicative of a defective medium. Based on the disclosure provided herein, one of ordinary skill in the art will recognize a variety of filters and/or filtering techniques that may be used in relation to different embodiments of the present invention to assure a more accurate designation of the media defect output.

It should be noted that transition from a defective media region to a non-defective media region is substantially the reverse of that shown in FIG. 5b. In such a case, once the ratio of output 454 to output 452 exceeds defect threshold 553, defect output 475 is again deasserted. In some cases, deassertion of defect output may be delayed for a defined period or for a certain number of consecutive calculation periods where the ratio exceeds defect threshold 553. Such an approach operates to filter out any spurious noise that is not necessarily indicative of the end of a defect region. Based on the disclosure provided herein, one of ordinary skill in the art will recognize a variety of filters and/or filtering techniques that may be used in relation to different embodiments of the present invention to assure a more accurate designation of the media defect output.

Figure 6:
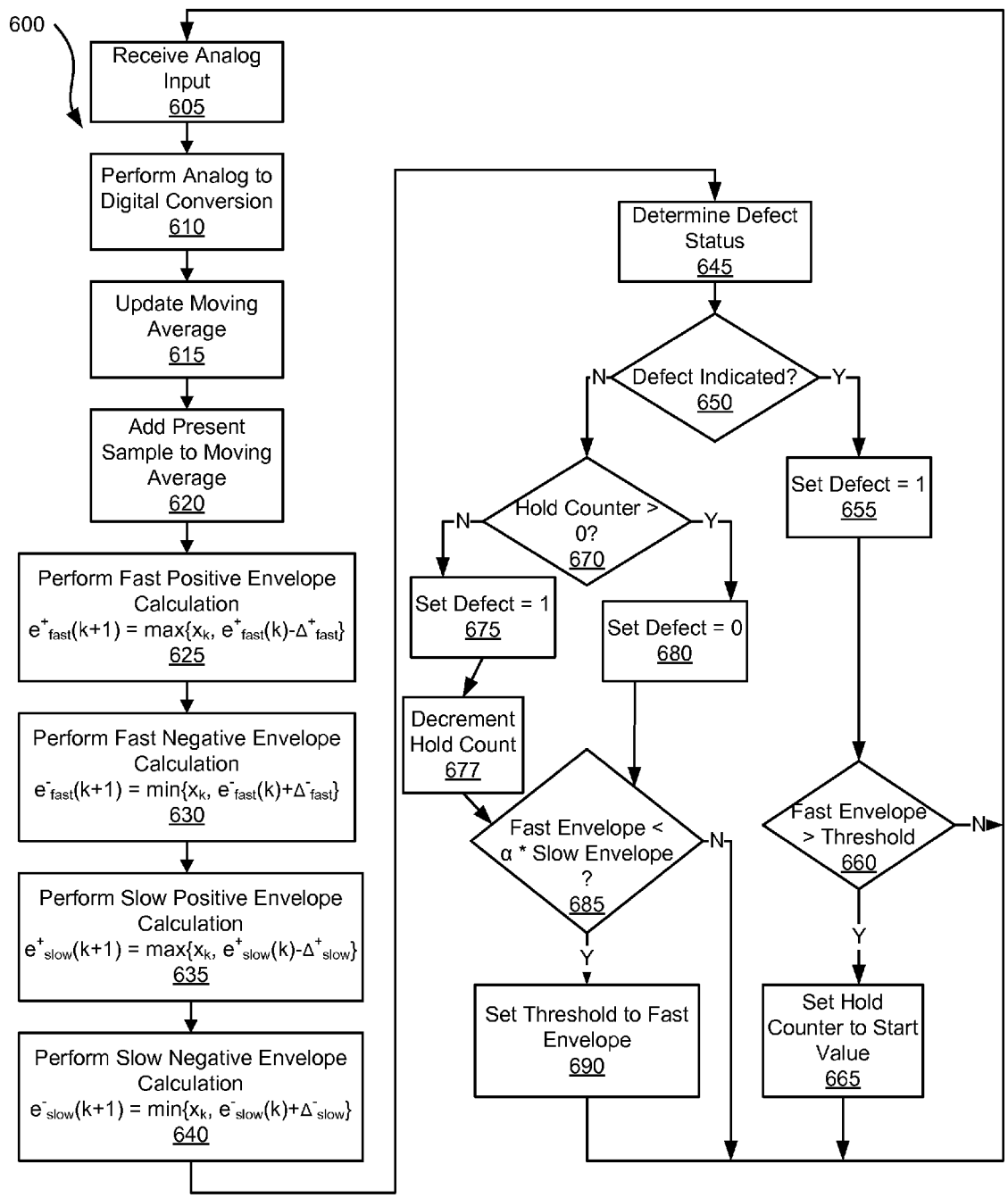
FIG. 6 is a flow diagram showing a process for detecting media defects and limiting the impact thereof in accordance with some embodiments of the present invention.

Turning to FIG. 6, a flow diagram 600 shows a process for detecting media defects and limiting the impact thereof in accordance with some embodiments of the present invention. Following flow diagram 600, an analog input is received (block 605). The analog input may be received, for example, via an analog front end receiving information from a medium. The medium may be, for example, a magnetic storage medium or an atmosphere through which a wireless transmission is transmitted. Based on the disclosure provided herein, one of ordinary skill in the art will recognize a variety of media from which an analog input may be derived. The analog input is converted to a series of digital samples using an analog to digital converter (block 610). The current digital sample is incorporated into a moving average value (block 615). This may include adding the most recent digital sample scaled by a factor to an existing moving average value, and subtracting the oldest digital sample included in the moving average scaled by the same factor from the existing moving average value. The negative of the updated moving average value is added to the most recent digital sample value (block 620). This process operates to reduce any DC offset introduced into the system.

A fast positive envelope calculation is performed (block 625), fast negative envelope calculation is performed (block 630), a slow positive envelope calculation is performed (block 635), and a slow negative envelope calculation is performed (block 640). The results of the aforementioned calculations are then used to determine a defect status of the medium from which the analog input was derived (block 645). The fast and slow calculations use the same algorithm, but use different decay rates (i.e., $\Delta_{fast}$, $\Delta_{slow}$). This process includes subtracting the result of the fast negative calculation from the result of the fast positive envelope calculation to yield a fast result, and subtracting the result of the slow negative calculation from the result of the slow positive envelope calculation to yield a slow result. In addition, a ratio of the fast result to the slow result is calculated. This ratio is compared with a defect threshold, and where the ratio falls below the defect threshold a defect is indicated (block 650). Otherwise, where the ratio exceeds the defect threshold, a defect is not indicated (block 650). Where a defect is indicated (block 650), a defect output is asserted (block 655). Where the fast result exceeds a defined threshold (block 660) indicating a potential end of the defect region, a hold counter is loaded with a defined start value (block 665) in preparation for maintaining the defect output asserted for a period after the end of a defect region is indicated.

Once a defect region is no longer indicated (block 650), it is determined whether the value in a hold counter is still greater than zero (block 670). Where the hold count is still greater than zero (block 670), the defect output is maintained asserted (block 675), and the hold counter is decremented (block 677). It is then determined whether the fast result is less than the slow result scaled by a factor $\alpha$ (block 685). In this case, $\alpha$ is a value between zero and unity. Once the fast result is less than the scaled slow result (block 685), the threshold used in block 660 is set equal to the current fast result (block 690). Where, on the other hand, the hold counter has decremented to zero (block 670), the defect flag is deasserted (block 680). The deassertion is delayed for the hold count to assure that the defective region has completed. As previously described, while the defect output is asserted, the feedback loops are disabled or put into a coast mode to stop a feedback reaction to spurious information derived from defective regions of a medium.

Figure 7:
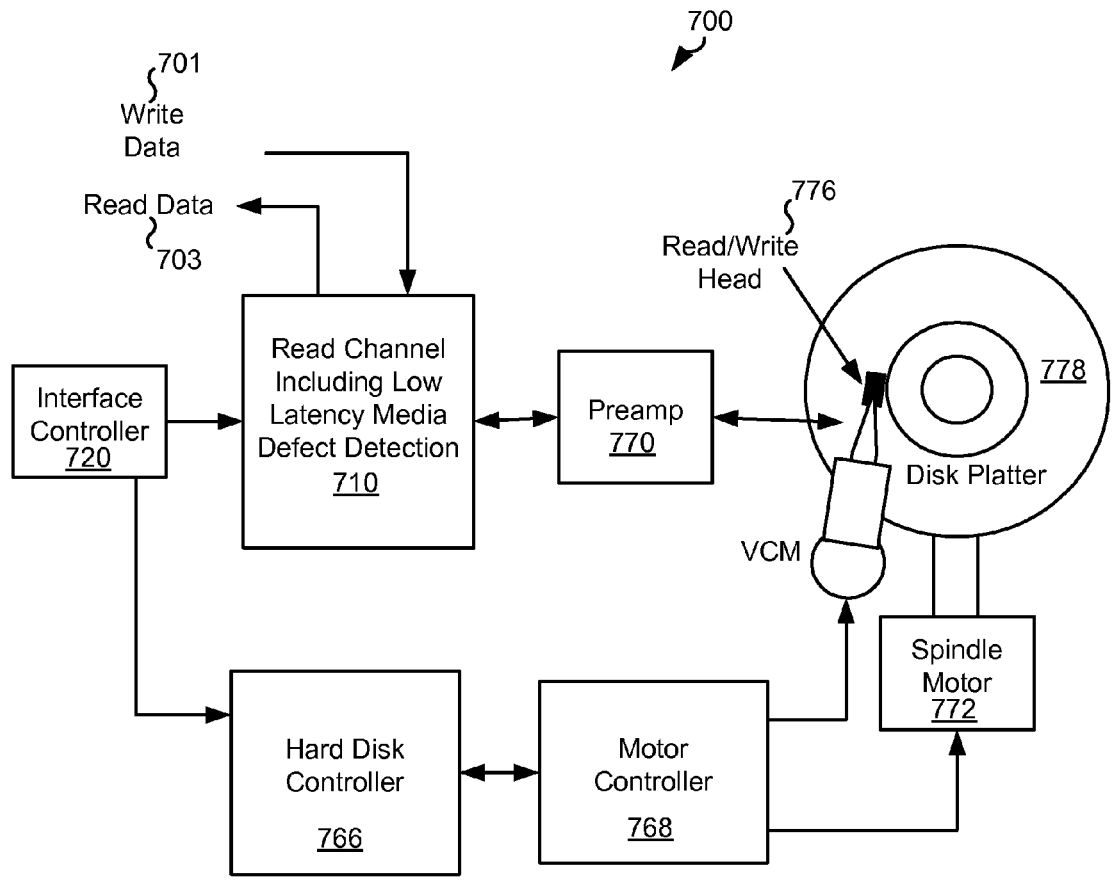
FIG. 7 shows a storage system including a media defect detector in accordance with one or more embodiments of the present invention.

Turning to FIG. 7, a storage system 700 including a media defect system is shown in accordance with various embodiments of the present invention. Storage system 700 may be, for example, a hard disk drive. Storage system 700 includes a read channel 710 with a low latency media defect detector. The incorporated media defect detector may be any media defect detector capable of determining a media defect based on a series of pre-processed digital samples (i.e., samples that have not been processed through a data detector). Thus, for example, the incorporated media defect detector may be, but is not limited to, media defect detector circuit 400. In addition, storage system 700 includes an interface controller 720, a preamp 770, a hard disk controller 766, a motor controller 768, a spindle motor 772, a disk platter 778, and a read/write head 776. Interface controller 720 controls addressing and timing of data to/from disk platter 778. The data on disk platter 778 consists of groups of magnetic signals that may be detected by read/write head assembly 776 when the assembly is properly positioned over disk platter 778. In a typical read operation, read/write head assembly 776 is accurately positioned by motor controller 768 over a desired data track on disk platter 778. Motor controller 768 both positions read/write head assembly 776 in relation to disk platter 778 and drives spindle motor 772 by moving read/write head assembly to the proper data track on disk platter 778 under the direction of hard disk controller 766. Spindle motor 772 spins disk platter 778 at a determined spin rate (RPMs).

Once read/write head assembly 778 is positioned adjacent the proper data track, magnetic signals representing data on disk platter 778 are sensed by read/write head assembly 776 as disk platter 778 is rotated by spindle motor 772. The sensed magnetic signals are provided as a continuous, minute analog signal representative of the magnetic data on disk platter 778. This minute analog signal is transferred from read/write head assembly 776 to read channel module 764 via preamp 770. Preamp 770 is operable to amplify the minute analog signals accessed from disk platter 778. In addition, preamp 770 is operable to amplify data from read channel module 710 that is destined to be written to disk platter 778. In turn, read channel module 710 decodes (including media defect detection) and digitizes the received analog signal to recreate the information originally written to disk platter 778. This data is provided as read data 703 to a receiving circuit. A write operation is substantially the opposite of the preceding read operation with write data 701 being provided to read channel module 710. This data is then encoded and written to disk platter 778.

Figure 8:
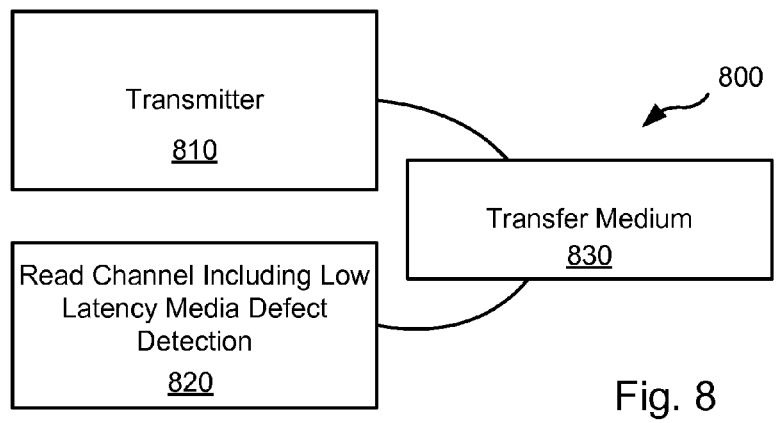
FIG. 8 shows a communication system including a receiver with a media defect detector in accordance with some embodiments of the present invention.

Turning to FIG. 8, a communication system 800 including a receiver 820 with a media defect system in accordance with one or more embodiments of the present invention is shown. Communication system 800 includes a transmitter that is operable to transmit encoded information via a transfer medium 830 as is known in the art. The encoded data is received from transfer medium 830 by receiver 820. Receiver 820 incorporates a media defect detection circuit that is operable to determine whether a "defect" has occurred in transfer medium 830. Thus, for example, where transfer medium 820 is the Internet, it may determine that no signal is being received. Alternatively, where transfer medium 820 is the atmosphere carrying wireless signals, the media defect detection circuit may indicate a very noisy and unreliable transfer environment. Based on the disclosure provided herein, one of ordinary skill in the art will recognize a variety of mediums that may include defects and that may be utilized in relation to different embodiments of the present invention. The incorporated media defect detector may be any media defect detector capable of determining a media defect based on a series of pre-processed digital samples (i.e., samples that have not been processed through a data detector). Thus, for example, the incorporated media defect detector may be, but is not limited to, media defect detector circuit 400.

In conclusion, the invention provides novel systems, devices, methods and arrangements for detecting media defects. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscribe line systems. Therefore, the above description should not be taken as limiting the scope of the invention, which is defined by the appended claims.

What is claimed is:

1. A media defect detection system, wherein the media defect detection system comprises:
a fast envelope calculation circuit operable to receive a data input derived from a medium and to provide a fast decay envelope value based on the data input;
a slow envelope calculation circuit operable to receive the data input and to provide a slow decay envelope value based on the data input; and
a media defect detection circuit operable to receive, the slow decay envelope value and the fast decay envelope value, to calculate a ratio value of the fast decay envelope value to the slow decay envelope value, and to assert a defect output based at least in part on the comparison of the ratio value to a defect threshold value, wherein the defect output indicates a defect on the medium.

2. The media defect detection system of claim 1, wherein the defect detection system is part of a data detection system including at least one adaptive feedback loop, and wherein the media defect detection circuit is operable to disable the adaptive operation of the adaptive feedback loop upon assertion of the defect output.

3. The media defect detection system of claim 1, wherein the system further comprises a moving average filter, wherein the moving average filter is operable to receive a current data sample and to calculate a moving average value based on the current data sample and one or more preceding data samples, and to subtract the moving average value from the current data sample to yield the data input.

4. The media defect detection system of claim 3, wherein the system further comprises an analog to digital converter, and wherein the current data sample and the one or more preceding data samples are provided by the analog to digital converter and correspond to an analog input received by the analog to digital converter.

5. The media defect detection system of claim 1, wherein the data input is a first data input; wherein the fast decay envelope value is a first fast decay envelope value; wherein the slow decay envelope value is a first slow decay envelope value; wherein the ratio value is a first ratio value; wherein the fast envelope calculation circuit is operable to receive the second data input and to provide a second fast decay envelope value based on the second data input; wherein the slow envelope calculation circuit is operable to receive the second data input and to provide a second slow decay envelope value based on the second data input; and wherein the media defect detection circuit is operable to receive the second slow decay envelope value and the second fast decay envelope value, to calculate a second ratio value of the second fast decay envelope value to the second slow decay envelope value, and to deassert the defect output based at least in part on the comparison of the second ratio value to the defect threshold value.

6. The media defect detection system of claim 5, wherein the media defect detection circuit further includes a counter operable to count calculation periods after the second ratio exceeds the defect threshold value, and wherein the defect output is deasserted when a count value of the counter reaches a defined value.

7. The media defect detection system of claim 1, wherein the medium is a wireless communication atmosphere, wherein the system further includes:
an analog front end, wherein the analog front end is operable to sense a radio frequency signal from the wireless communication atmosphere and to produce a digital sample corresponding to the radio frequency signal.

8. The media defect detection system of claim 1, wherein the medium is a magnetic storage medium, wherein the system further includes:
an analog front end, wherein the analog front end is operable to sense a magnetic field on the magnetic storage medium and to produce a digital sample corresponding to the sensed magnetic field.

9. The media defect detection system of claim 1, wherein the medium is a magnetic storage medium.

10. The media defect detection system of claim 1, wherein the medium is a wireless communication medium.

11. A method for detecting a media defect, the method comprising:
deriving a data input from a medium;
calculating a fast decay envelope value using the data input;
calculating a slow decay envelope value using the data input;

calculating a ratio of the fast decay envelope value to the slow decay envelope value to generate a ratio value; and asserting a defect output based at least in part on a comparison of the ratio value with a defect threshold value, wherein the defect output indicates a defect on the medium.

12. The method of claim 11, wherein the method further comprises:
providing a data detection circuit including at least one feedback loop; and
disabling the at least one feedback loop when the defect output is asserted.

13. The method of claim 12, wherein disabling the at least one feedback loop includes forcing an error indicator to a value indicating the lack of an error.

14. The method of claim 11, wherein the data input includes a moving average of a number of preceding input values subtracted from a current input value.

15. The method of claim 11, wherein the data input is a first data input, wherein the fast decay envelope value is a first fast decay envelope value, wherein the slow decay envelope value is a first slow decay envelope value, wherein the ratio value is a first ratio value, and wherein the method further includes:
deriving a second data input from the medium;
calculating a second fast decay envelope value using the second data input;
calculating a second slow decay envelope value using the second data input;
calculating a second ratio of the second fast decay envelope value to the second slow decay envelope value to generate a second ratio value; and
deasserting the defect output based at least in part on a comparison of the second ratio value with the defect threshold value.

16. The method of claim 15, wherein the method further comprises:
waiting a defined period after the comparison of the second ratio value with the defect threshold to deassert the defect output.

17. The method of claim 11, wherein the medium is a magnetic storage medium, wherein deriving the data input from the medium includes sensing a magnetic field on the magnetic storage medium and producing a digital sample corresponding to the sensed magnetic field.

18. The method of claim 11, wherein the medium is a wireless communication atmosphere, wherein deriving the data input from the medium includes sensing a radio frequency signal from the wireless communication atmosphere and producing a digital sample corresponding to the sensed radio frequency signal.

19. A storage device, the storage device comprising:
a storage medium;
a head assembly operable to sense information from the storage medium and to provide an electrical signal corresponding to the information;
a signal conversion circuit operable to receive the electrical signal and to provide a corresponding data input; and
a media defect detection circuit including:
a fast envelope calculation circuit operable to receive the data input and to provide a fast decay envelope value based on the data input;
a slow envelope calculation circuit operable to receive the data input and to provide a slow decay envelope value based on the data input; and
a media defect detection circuit operable to receive the slow decay envelope value and the fast decay envelope value, to calculate a ratio value of the fast decay envelope value to the slow decay envelope value, and to assert a defect output based at least in part on the comparison of the ratio value to a defect threshold value, wherein the defect output indicates a defect on the storage medium.

20. The storage device of claim 19, wherein the defect detection circuit is part of a data detection system including at least one adaptive feedback loop, and wherein the media defect detection circuit is operable to disable the adaptive operation of the adaptive feedback loop upon assertion of the defect output.

* * * * *